United States Patent
Gilbertson et al.

(10) Patent No.: US 9,638,343 B2
(45) Date of Patent: *May 2, 2017

(54) SHARP-PHASE CHANGE SHAPE MEMORY ALLOY THERMAL ACTUATOR

(71) Applicants: Chevron U.S.A. Inc., San Ramon, CA (US); Massachusetts Institute of Technology, Cambridge, MA (US)

(72) Inventors: Eric Wright Gilbertson, Cambridge, MA (US); Franz Hover, Somerville, MA (US); Donald Bryan Freeman, Houston, TX (US); Jose Arellano, Houston, TX (US)

(73) Assignees: MASSACHUSETTS INSTITUTE OF TECHNOLOGY, Cambridge, MA (US); CHEVRON U.S.A. INC., San Ramon, CA (US)

( * ) Notice: Subject to any disclaimer, the term of this patent is extended or adjusted under 35 U.S.C. 154(b) by 633 days.

This patent is subject to a terminal disclaimer.

(21) Appl. No.: 13/711,391

(22) Filed: Dec. 11, 2012

(65) Prior Publication Data

US 2013/0146155 A1 Jun. 13, 2013

Related U.S. Application Data

(60) Provisional application No. 61/569,447, filed on Dec. 12, 2011.

(51) Int. Cl.
*G05D 15/00* (2006.01)
*F16K 17/38* (2006.01)
(Continued)

(52) U.S. Cl.
CPC ............ *F16K 31/12* (2013.01); *E21B 43/123* (2013.01); *F16K 31/002* (2013.01); *Y10T 137/7737* (2015.04)

(58) Field of Classification Search
CPC ...... F16K 31/002; F16K 31/12; E21B 43/123; Y10T 137/7737
(Continued)

(56) References Cited

U.S. PATENT DOCUMENTS 4,895,438 A * 1/1990 Zider et al. ............... 351/41
6,114,851 A * 9/2000 Kruspe ............... G01V 3/32
324/303

(Continued)

OTHER PUBLICATIONS

International Search Report and Written Opinion issued in connection with corresponding PCT Application No. PCT/US12/069232 mailed on Apr. 10, 2013.

(Continued)

*Primary Examiner* — Henry Crenshaw
(74) *Attorney, Agent, or Firm* — Gesmer Updegrove LLP

(57) ABSTRACT

A valve actuator, valve, and method of actuation of a valve are disclosed. The valve actuator includes a shape memory alloy element attachable to a valve body, capable of use with a valve to cause movement of the valve between first and second positions responsive to at least a threshold amount of temperature change of the shape memory alloy element. The valve actuator further includes a negative-differential spring applied to the shape memory alloy element, thereby reducing the threshold amount of temperature change needed to cause movement of the valve between the first and second positions.

15 Claims, 12 Drawing Sheets

(51) Int. Cl.
*F16K 31/12* (2006.01)
*F16K 31/00* (2006.01)
*E21B 43/12* (2006.01)

(58) Field of Classification Search
USPC .......................................................... 137/486
See application file for complete search history.

(56) References Cited

U.S. PATENT DOCUMENTS

| | | | |
|---|---|---|---|
| 6,837,620 B2* | 1/2005 | Shahinpoor | 374/205 |
| 2003/0112846 A1* | 6/2003 | Murtagh | G01K 1/16 |
| | | | 374/149 |
| 2004/0247386 A1* | 12/2004 | Sugiyama et al. | 403/408.1 |
| 2005/0115235 A1* | 6/2005 | Mernoe | 60/527 |
| 2006/0043683 A1 | 3/2006 | Ocalan | |
| 2006/0048936 A1 | 3/2006 | Fripp et al. | |
| 2006/0191267 A1* | 8/2006 | Song et al. | 60/771 |
| 2007/0227775 A1* | 10/2007 | Ma et al. | 175/26 |
| 2009/0139727 A1 | 6/2009 | Tanju et al. | |
| 2009/0151924 A1 | 6/2009 | Lake | |
| 2009/0222075 A1* | 9/2009 | Gordon | 623/1.2 |
| 2009/0302264 A1* | 12/2009 | Serrano | C09K 5/045 |
| | | | 252/68 |
| 2010/0140439 A1* | 6/2010 | Schuh et al. | 248/562 |
| 2010/0207775 A1* | 8/2010 | Lenneman et al. | 340/686.1 |
| 2010/0242673 A1* | 9/2010 | Laufenberg | 74/99 R |

OTHER PUBLICATIONS

Gilbertson, "Gas Lift Valve Failure Mode Analysis and the Design of a Thermally-Actuated Positive-Locking Safety Valve" Dec. 31, 2010 pp. 1-135.
International Preliminary Report on Patentability issued in connection with corresponding PCT Application No. PCT/US2012/069232 mailed on Jun. 26, 2014.

* cited by examiner

SHARP-PHASE CHANGE SHAPE MEMORY ALLOY THERMAL ACTUATOR

CROSS REFERENCE TO RELATED APPLICATIONS

The present application claims priority from U.S. Provisional Patent Application No. 61/569,447, filed on Dec. 12, 2011, the disclosure of which is hereby incorporated by reference in its entirety.

TECHNICAL FIELD

The present disclosure relates generally to thermal actuators. In particular, the present disclosure relates to a sharp phase change shape memory alloy thermal actuator.

BACKGROUND

Gas lift is an artificial lifting method used to produce oil from wells that do not flow naturally. In gas-lifted wells, gas is injected through the well annulus and into the well tubing at a down-well location. The gas mixes with the oil in the tubing, aerating the oil and causing it to rise to the surface.

To pass through the annulus to the tubing, the injection gas flows through a valve commonly referred to as a gas lift valve. Gas lift valves are one-way valves that allow gas to pass from the annulus to the tubing but prevent oil from passing through to the annulus. Most valves contain a pressurized bellows and an internal check valve. The bellows opens when the injection gas is pressurized above a threshold value, and the internal check valve prevents oil from passing through the gas lift valve.

A gas lift valve can fail if it allows oil passage from the tubing to the annulus. For failure to occur, at least two conditions are simultaneously met: (1) the reverse-flow check valve has a leak and the tubing pressure exceeds the gas pressure; and (2) a combination of high tubing pressure and low gas pressure allows the bellows valve to open. Further, if both the check valve and the bellows valve leak, then backflow can occur any time the tubing pressure exceeds the annulus pressure. Proper function of gas lift valves is very important for the safety of the well and surface operations. For example, if hydrocarbons flow through the annulus and reach the wellhead, an undesired accumulation of high-pressure combustible materials may occur at the well and surface, and hence may increase the risk of injury to personnel and/or damage to equipment, as well as disruptions in operation. Gas lift valves are thus susceptible to leakage, with seal corrosion being a major contributing factor.

Existing gas-lift safety valve designs can be designed to actuate and close, preventing backflow in the event of a change in temperature at the safety valve. However, these designs have disadvantages. For example, existing designs generally require a temperature difference of at least about 6° C. for actuation. This temperature difference is not always present in the event of a valve leak; therefore, risk of backflow remains.

SUMMARY

In accordance with the following disclosure, the above and other issues are addressed by the following:

In a first aspect, a valve actuator includes a shape memory alloy element attachable to a valve body, capable of use with a valve to cause movement of the valve between first and second positions responsive to at least a threshold amount of temperature change of the shape memory alloy element. The valve actuator further includes a negative-differential spring applied to the shape memory alloy element, thereby reducing the threshold amount of temperature change needed to cause movement of the valve between the first and second positions.

In a second aspect, a valve includes a valve body, an orifice within the valve body, and a fluid flow restraining member located at a first location of the orifice. The fluid flow restraining member movable between a closed position and an open position. The valve further includes a shape memory alloy element causing a pivotal movement of the fluid flow restraining member between the open and closed positions responsive to at least a threshold amount of temperature change of the shape memory alloy element. The valve also includes a negative-differential spring applied to the shape memory alloy element, thereby reducing the threshold amount of temperature change needed to cause movement of the valve between the open and closed positions.

In a third aspect, a method of actuating a valve from an open position to a closed position includes applying a force to a shape memory alloy using a negative-differential spring, thereby reducing a threshold temperature change needed to cause movement of the valve between first and second positions. The method further includes experiencing a change in temperature from a first temperature to a second temperature at a valve actuator including the shape memory alloy, and actuating the valve between the open position and the closed position in response to the change in temperature, wherein the change in temperature is greater than the threshold temperature change.

BRIEF DESCRIPTION OF THE DRAWINGS

The systems and methods described herein can be better understood with reference to the following drawings. The components in the drawings are not necessarily drawn to scale, emphasis instead being placed upon clearly illustrating the principles of the present disclosure. In the drawings, like reference numerals designate corresponding parts throughout the several views.

DETAILED DESCRIPTION

Disclosed herein are certain embodiments of a thermal actuator implemented using a shape memory alloy (SMA). The thermal actuator can be used as a valve actuator, such as for a gas lift safety valve used in a gas-lifted well. Additionally, thermal signaling in SMA-actuated flow control elements can be applied in a variety of operational scenarios, because no power or communication is needed.

In some embodiments, the thermal actuator includes a shape memory alloy element attachable to a valve body and capable of use with a valve to cause movement of the valve between first and second positions responsive to a threshold amount of temperature change of the shape memory alloy element. In such embodiments, a negative-differential spring is applied to the shape memory alloy element, thereby reducing the threshold amount of temperature change needed to cause movement of the valve between first and second positions. The thermal actuator provides for a sharp phase change, such that thermally-actuated valves with which it is associated will be applicable to a larger range of applications and available temperature differences.

These advantages and/or features, among others, are described hereinafter in the context of a gas-lifted oil well environment, with the understanding that other applications and/or environments exist in which such a thermal actuator may be advantageous. Generally, in the context of a gas-lifted oil well, other applications may exist where unsatisfactory consequences of failure of a downstream check valve (integrated or otherwise) may be ameliorated or eliminated using the embodiments described herein. Further, it should be understood by one having ordinary skill in the art that, though specifics for one or more embodiments are disclosed herein, such specifics as described are not necessarily part of every embodiment.

Figure 1:
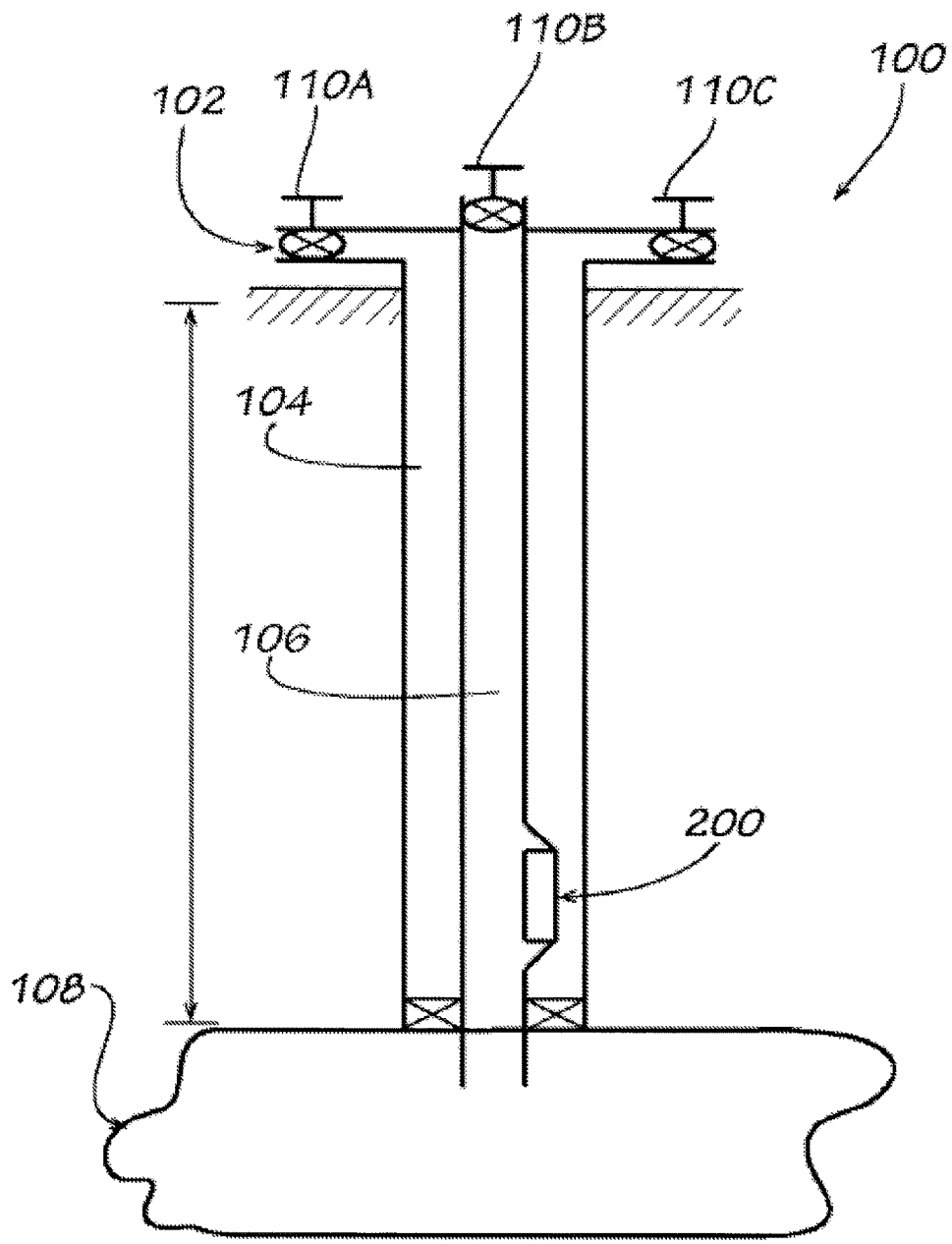
FIG. 1 is a schematic diagram of an example environment in which an embodiment of a thermally-actuated gas lift safety valve may be implemented.

Attention is directed to FIG. 1, which is an example environment in which embodiments of a thermal actuator according to the present disclosure can be employed. In this example application, the thermal actuator can be integrated into a thermally-actuated gas lift safety valve. In particular, FIG. 1 depicts a gas-lifted oil well 100 in which a thermally-actuated gas lift safety valve 200 is used. It should be understood by one having ordinary skill in the art, in the context of the present disclosure, that the gas-lifted oil well 100 shown in FIG. 1 is merely illustrative, and should not be construed as implying any limitations upon the scope of the disclosure. The gas-lifted oil well 100 comprises a piping infrastructure 102 located both partially above and beneath (e.g., extending 5 km beneath, though not limited to such applications) the sea floor (the latter indicated by diagonal lines in FIG. 1). The piping infrastructure 102 comprises an annulus 104 surrounding tubing 106, the tubing extending into a reservoir 108 of crude oil. Proximal to the sea floor surface are safety valves (e.g., flapper valves) 110A and 110C (restricting fluid flow through the annulus 104) and safety valve (e.g., flapper valve) 110B (restricting fluid flow through the tubing 106). Though described using flapper valves 110A, 110B, and 110C, other valves with similar functionality may be used as is known in the art. The thermally-actuated gas lift safety valve 200 enables gas to be injected from the annulus 104 to the tubing 106 to aerate the oil sourced from the reservoir 108, while preventing the ingress of the oil as it flows via aeration through the tubing 106 and to the annulus 104.

Figure 2:
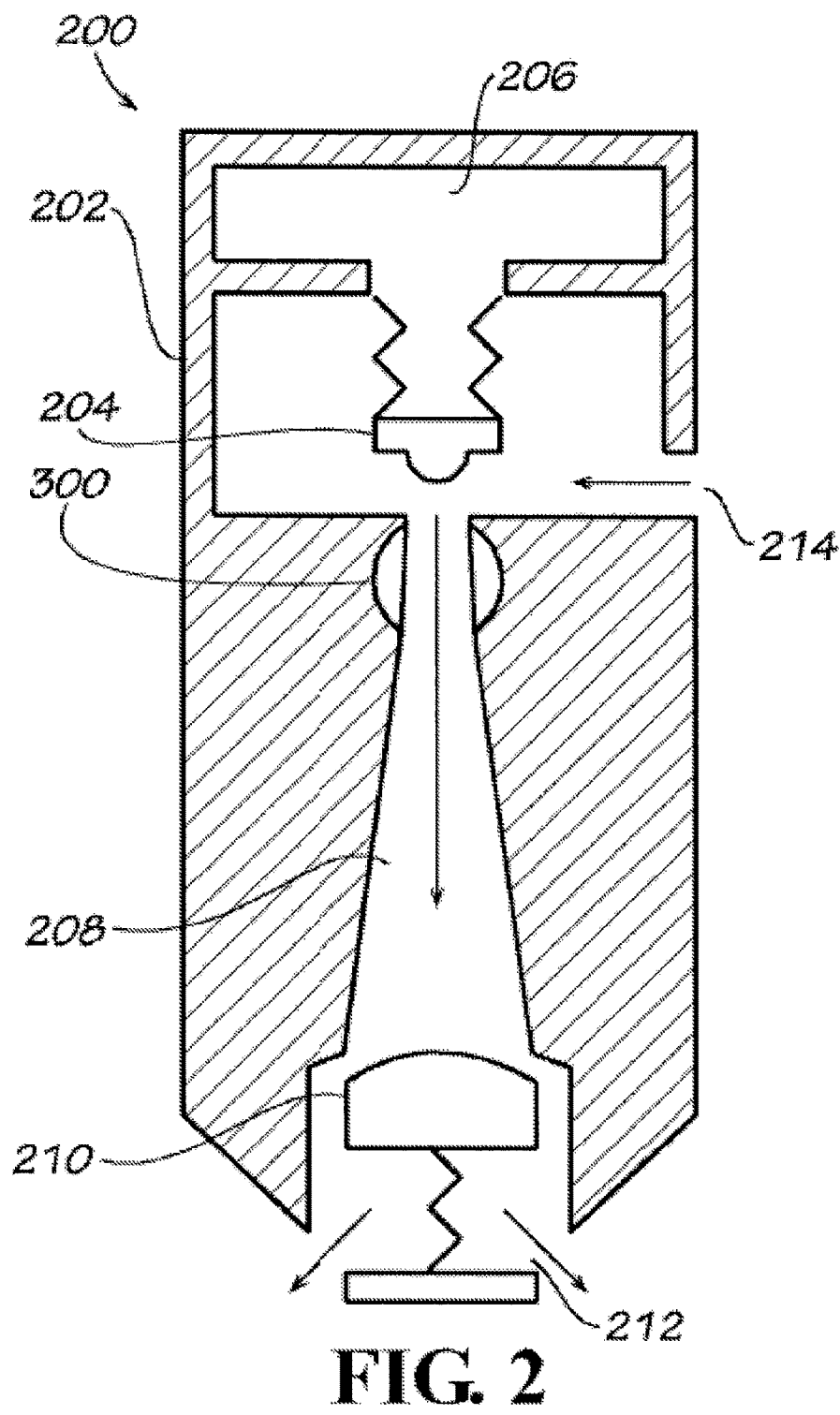
FIG. 2 is a schematic diagram that generally depicts an embodiment of a thermally-actuated gas lift safety valve.

Referring now to FIG. 2, a thermally-actuated gas lift safety valve 200 is shown in schematic, generalized (partially cut-away, upright position) form. The thermally-actuated gas lift safety valve 200 represents an example valve that could include a thermal actuator having a sharp phase change, as discussed further below. It should be understood by one having ordinary skill in the art, in the context of the present disclosure, that the thermally-actuated gas lift safety valve 200 shown in FIG. 2 is merely illustrative, and should not be construed as implying any limitations upon the scope of the disclosure.

The thermally-actuated gas lift safety valve 200 includes a valve body 202 suitably constructed with a material to withstand sub-sea surface pressure and/or temperatures (e.g., well temperatures may range from 20° C. to 70° C.). Enclosed within one end (proximal to the annulus 104, or as depicted in FIG. 2, the topmost position) of the valve body 202 is a bellows valve 204, depicted in FIG. 2 with a bellows chamber 206 for containing a suitable pressurized gas, such as nitrogen gas, among others. It should be understood that other configurations for a bellows valve 204 may be used in some embodiments, including those that use a spring with a charged bellows assist, among others well-known to those having ordinary skill in the art. Adjacent to (e.g., immediately beneath) the bellows valve 204 is a fluid flow restraining member assembly 300, which in one embodiment comprises a ball valve, stem, and extending member(s) as explained further below. The fluid flow restraining member assembly 300 resides adjacent the bellows valve 204 and proximal to a gas inlet end of an orifice 208, which in one embodiment is configured as a Venturi orifice. In some embodiments, the orifice 208 may be configured according to a different structure, such as a square-edged orifice. Proximal to the opposite end of the orifice 208 is a check valve 210, which allows fluid flow to be discharged from an outlet 212 of the thermally-actuated gas lift safety valve 200 while inhibiting flow in the reverse direction (e.g., toward the fluid flow restraining member assembly 300). In some embodiments, the check valve 210 may be implemented as an apparatus separate from the thermally-actuated gas lift safety valve 200, yet used in combination.

In an example aeration operation, as depicted in FIG. 2 by the use of arrows (with continued reference to FIG. 1), flow of gas to aerate the oil of the reservoir 108 proceeds from the annulus 104 to an inlet of the thermally-actuated gas lift safety valve 200. Upon the pressure of the gas from the annulus 104 overcoming the pressurized gas of the bellows valve 204, the bellows valve 204 opens and the gas flows through the opened ball valve of the fluid flow restraining member assembly 300, through the orifice 208, and past the check valve 210 and outlet 212 and into the tubing 106.

Figure 3:
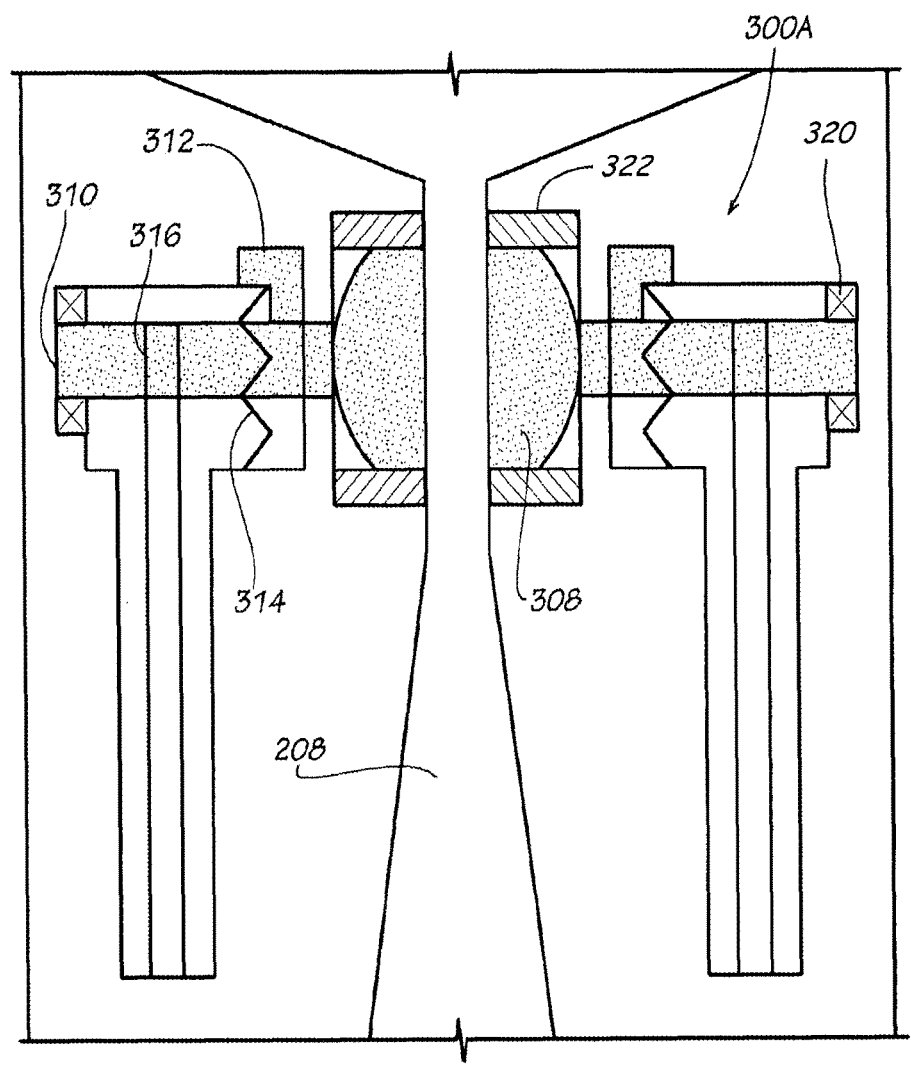
FIG. 3 is a schematic diagram that shows a partial cut-away, side elevation view of an embodiment of a thermally-actuated gas lift safety valve in which a shape memory alloy element can be incorporated.

Referring to FIG. 3, a partial cut-away (e.g., side elevation) schematic view of portions of a thermally-actuated gas lift safety valve 200A are shown. In particular, an example valve 200A of the fluid flow restraining member assembly 300 (depicted in FIG. 3 with reference numeral 300A) is situated between the bottom of the bellows valve 204 and proximal to the one end of the orifice 208. The fluid flow restraining member assembly 300A includes the ball valve 308 and extending members 310 extending in one embodiment from opposing sides of the ball valve 308. Each extending member 310 is connected to a stopper 312 located proximally to the ball valve 308, the former which serves to constrain rotation of the fluid flow restraining member assembly 300A. A force assist member (e.g., spring) 314 is radially wound about at least a portion of each extending member 310. Shape memory alloy elements 316 are attached to each extending member 310 to enable rotation actuation. The respective extending members 310 further comprise lubricated joint bearings 320 at each end (end opposite the end adjacent to the stopper 312) for valve rotation. Sealing members 322 create a water-tight seal at the ball valve openings. Sealing members 322 may be embodied as elastomeric O-rings, or in some embodiments, other types of well-known water-tight sealing material such as packing, etc.

Additional details regarding such a gas-lift safety valve are disclosed in U.S. patent application Ser. No. 13/075,424 "Thermally-Actuated Gas-Lift Safety Valve", the entire disclosure of which is hereby incorporated by reference in its entirety. That application describes use of a commercially available shape memory alloy (SMA) as an actuator in such a valve. However, using the gas-lift safety valve as contemplated therein, there may be some circumstances where actuation may not occur properly. This is because typically such an SMA relies on a well-bore fluid temperature difference of at least 6° C. to completely actuate. Because some wells may have less than 6° C. temperature difference, the safety valve design described in that earlier application could not be applied.

Figure 4:
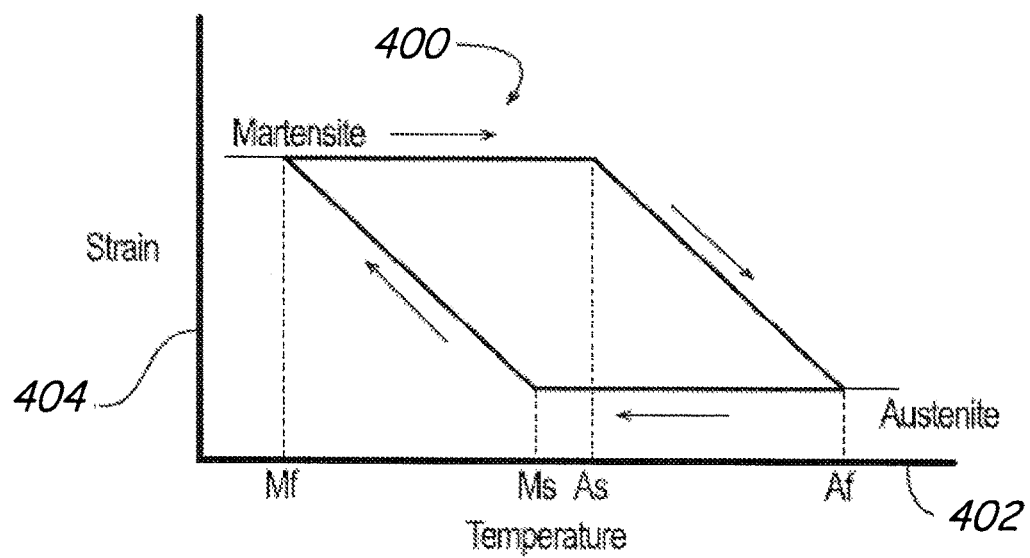
FIG. 4 is a hysteresis diagram that illustrates an example operation of the shape memory alloy element of an embodiment of a thermally-actuated gas lift safety valve.

A further understanding of an example operation of a thermal actuator, and in particular differences between the actuator of U.S. patent application Ser. No. 13/075,424 and that of the present disclosure, are discussed generally in accordance with a hysteresis diagram 400, as shown in FIG. 4. The diagram 400 includes a horizontal axis 402 corresponding to temperature, and a vertical axis 404 corresponding to strain. In general, shape memory alloys are alloys that undergo a solid state phase change between a Martensitic low-temperature state and an Austenitic high-temperature state when heated or cooled. These types of alloys are said to have "memory" because they return to the same low-temperature shape whenever cooled to the Martensitic state and to the same high-temperature shape when heated to the Austenitic state. As illustrated in FIG. 4, shape memory alloys do not have a single transition temperature between Martensite and Austenite, but instead undergo a hysteresis, with different transition temperatures depending on whether the alloy is being cooled or heated. Referring to FIG. 4, when the alloy is being heated, $A_s$ represents the start of the transition from Martensite to Austenite and $A_f$ represents the final transition to Austenite. When being cooled, $M_s$ represents the start of the transition from Austenite to Martensite and $M_f$ represents the final transition to Martensite. Based on the alloy proportion, a shape memory alloy may have transition temperatures within the range of −150° C. to +800° C. It should be understood in the context of the present disclosure that transition temperatures of the shape memory alloy elements 316 may be "tuned" to match any or substantially any given well conditions (e.g., manufacturers may alter the alloy composition to achieve different transition temperatures).

Figure 5A:
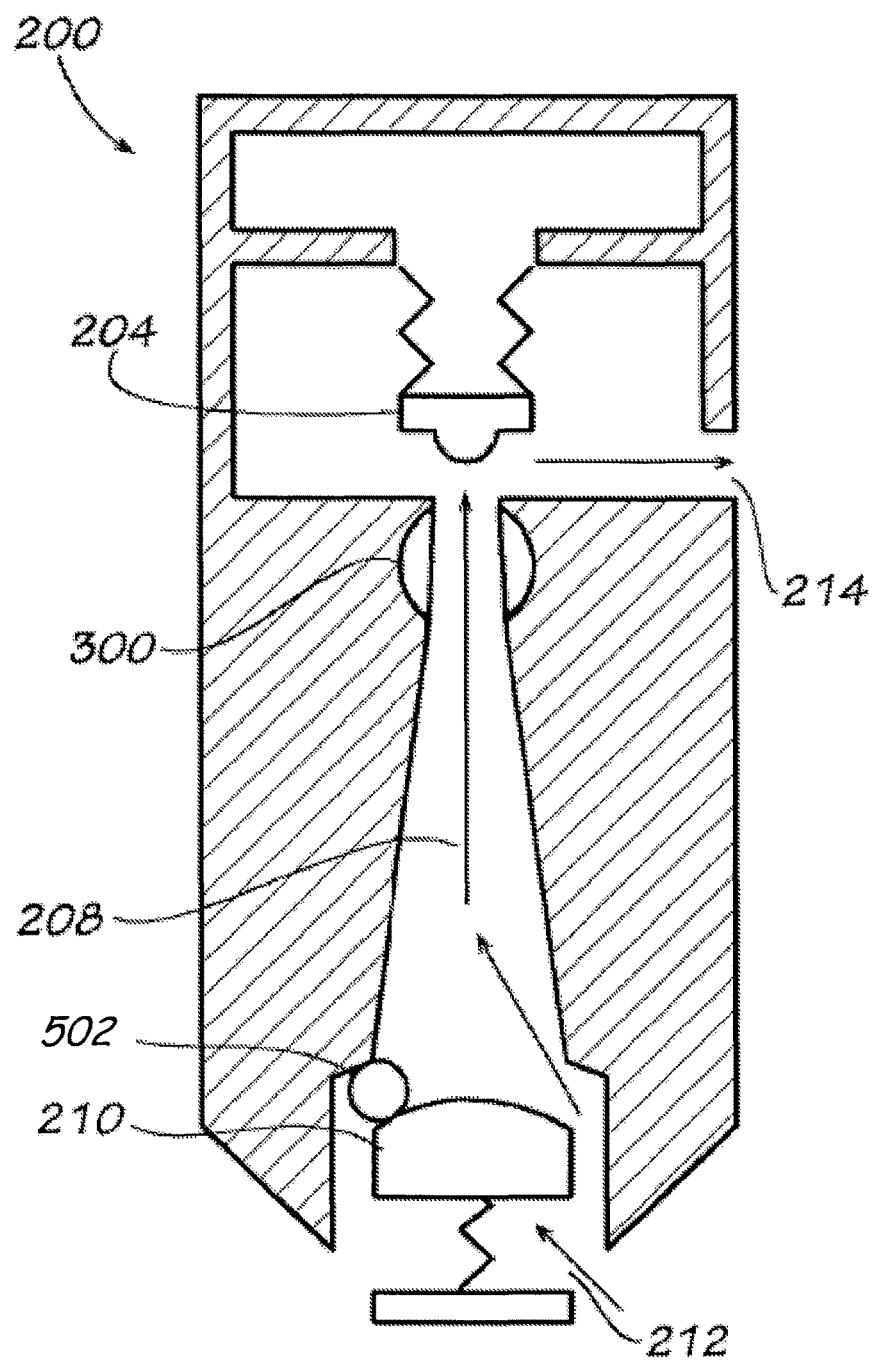
FIGS. 5A-5B are schematic diagrams that illustrate an example operation of an embodiment of a thermally-actuated gas lift safety valve when debris hinders proper operation of a check valve integrated into the thermally-actuated gas lift safety valve.
Figure 5B:
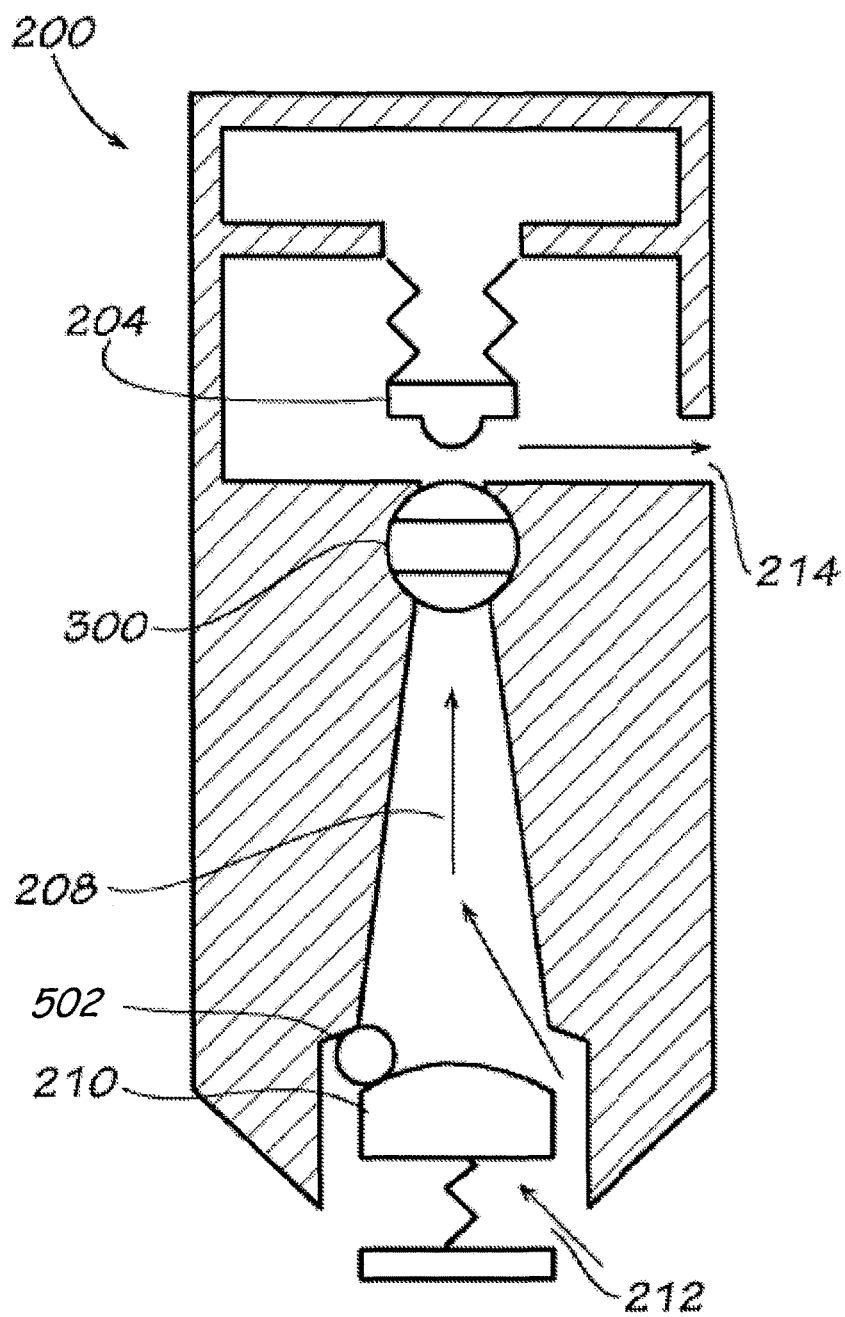

FIGS. 5A-5B are schematic diagrams that illustrate an example circumstance in which the thermally-actuated gas lift safety valve 200 of FIG. 2 may be actuated. In particular, FIGS. 3A-3B illustrate an example of operation of the thermally-actuated gas lift safety valve 200 when debris hinders proper operation of a check valve integrated into the thermally-actuated gas lift safety valve (i.e., failure mode operation of the valve).

It is noted that the thermally-actuated gas lift safety valve 200 shown in FIGS. 5A-5B is the same as, or similar to, the thermally-actuated gas lift safety valve 200 shown in FIG. 2, with the addition of debris 502 trapped between the check valve 210 and an interior surface of the orifice 208. In general, the thermally-actuated gas lift safety valve 200 relies on the temperature difference between the injected gas in the annulus 104 and the oil in the tubing 106. When the gas is injected through the thermally-actuated gas lift safety valve 200, the valve 200 is cooler than during a backflow situation. Thus, in a backflow situation, the thermally-actuated gas lift safety valve 200 heats up and closes. More particularly, a thermal actuator including a shape memory alloy element 316 is set to have a transition temperature $A_s$ above the injected gas temperature and an $A_f$ value below the oil temperature. The $M_s$ and $M_f$ transition temperature values are set to values between the oil temperature and the coldest temperature attainable in the valve-cooling scenario.

The failure conditions depicted in FIG. 5A represent the presence of debris 502 trapped in the check valve 210 (though other mechanisms of failure that halt proper movement of the check valve are contemplated), and the annulus pressure required to open the bellows valve 204 ($P_{open}$) being less than the actual pressure in the annulus 104 ($P_{ann}$), which is less than the pressure in the tubing 106 ($P_{tube}$). In other words, $P_{open} < P_{ann} < P_{tube}$. Under these conditions, oil flows improperly (as indicated by the single-headed arrows in FIGS. 5A-5B) through the outlet 212 into the orifice 208, through the opened ball valve 308 and opened bellows valve 204 and through the inlet 214 into the annulus 104. As the oil begins passing through the thermally-actuated gas lift safety valve 200, the entire thermally-actuated gas lift safety valve 200 heats up, in turn heating up the shape memory alloy elements 316 (e.g., by conduction of the heat through the body or housing of the thermally-actuated gas lift safety valve 200) to the oil reservoir temperature. Further, the absence of the cooler injection gas together with the heat conduction affects the shape memory alloy elements 316. In other words, the shape memory alloy elements 316 contract as they heat up past $A_s$ and $A_f$, and thus pull the ball valve 308 (through actuation upon the extending members 310) into a closed (e.g., horizontal) position, as indicated in FIG. 5B.

If the shape memory alloy elements 316 cool and transition to the Martensite state, the shape memory alloy elements 316 expand and the force assist members 314 pull the ball valve 308 back into the open position. In other words, the force assist members 314 assist in restoring the ball valve 308 to the open position.

In applications in which the thermal actuation is required based on a relatively small change in temperature, it is advisable to have the Austenitic transition start temperature, $A_s$, be as close to the Austenitic transition final transition temperature, $A_f$. Although, as discussed in U.S. patent application Ser. No. 13/075,424, typical transition temperature differentials generally require a substantial change in temperature, it is recognized that the change in these temperatures is also dependent upon stress applied to the shape memory alloy. This can be expressed by the following equations, representing differences in $A_s$ and $A_f$ in response to strain:

$$A_{s\sigma} = A_s + \sigma/C$$

$$A_{f\sigma} = A_f + \sigma/C$$

where $A_{s\sigma}$ is the Austenite start transition temperature under external stress $\sigma$, $A_s$ is the Austenite start transition temperature under no external stress, $A_{f\sigma}$ is the Austenite finish transition temperature under external stress $\sigma$, $A_f$ is the Austenite finish transition temperature under no external stress, and C is a constant dependent on the material.

As such, if a greater strain were introduced at the point where a shape memory alloy were at or near the Austenitic transition start temperature, $A_s$, as compared to the Austenitic transition final transition temperature, $A_f$, the two temperatures could be closer. In accordance with the various configurations described below in FIGS. 6-13, application of a negative-differential spring to the shape memory alloy introduces greater strain at or near the lower $A_s$ temperature than at the higher $A_f$ temperature. As described in the present disclosure, in some embodiments the difference in strain applied by the negative-differential spring will vary in a continuous linear or curved gradient between the lower $A_s$ temperature and the higher $A_f$ temperature. As such, when the current temperature is near, or closer to, the lower $A_s$ temperature, the force will correspondingly be higher. As such, it is possible to arrange a thermal actuator that has a sharp response (i.e., an actuation response below the previously available 6° C. temperature variation). In particular, a variety of types of negative-differential spring arrangements can be used, such as a mass on a lever rotating from horizontal to vertical, a coiled metal ribbon of decreasing width, or a wire rotating a cam of decreasing radius.

In some embodiments, the negative-differential spring can be implemented as an opposing shape memory alloy element. In this differential SMA configuration, two SMA wires are attached antagonistically and each heated independently. One wire acts as the actuator, while the other used as the restoring wire. As the actuating wire is heated and contracts, the restoring wire is pulled in tension and undergoes stress-induced Martensitic transformation. The restoring wire has a high initial stiffness, and then a lower stiffness after Martensitic transformation. Thus the restoring wire acts as a negative-differential spring and decreases the amount of temperature change necessary to transform the actuating wire. To reverse this process, the restoring wire is heated and acts as an actuator in the reverse direction while the other wire acts as the restoring wire.

The main use of differential SMA actuators is to shorten cycling time of the actuation system. This setup, however, is not generally suited to an application where only conductive heating is available, such as the gas-lift safety valve application discussed above in connection with FIGS. 1-3 and 5A-5B.

Figure 6:
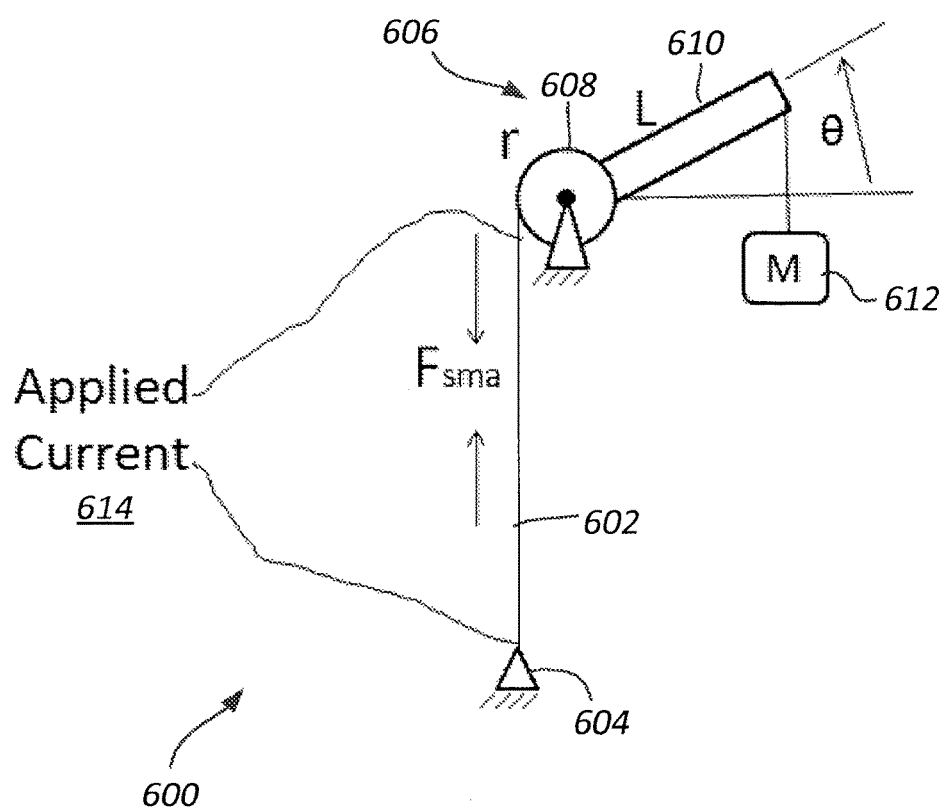
FIG. 6 is a schematic diagram illustrating a test arrangement used to form a thermal actuator including a shape memory alloy and having a sharp phase change, according to an example embodiment.

Referring now to FIGS. 6-9, a first test arrangement and associated test of a thermal actuator including a shape memory alloy and having a sharp phase change is discussed. FIG. 6 illustrates a first test arrangement 600 used to form a thermal actuator including a shape memory alloy and having a sharp phase change, according to an example embodiment. Test arrangement 600 generally represents an electrical heating arrangement of a shape memory alloy useable to illustrate the negative-differential spring concept described above.

In the embodiment shown, the test arrangement 600 includes a shape memory alloy 602 interconnected between a ground 604 and a rotatable lever 606. The rotating lever 606 includes a generally circular portion 608 and an arm 610. A mass 612 is pivotally attached to an end of the arm 610, such that in the embodiment shown the mass 612 hangs downwardly from the arm 610. A current source 614 applies current across the shape memory alloy 602 to heat the alloy, including through a temperature change between $A_s$ and $A_f$.

Assuming the circular portion 608 has a radius r and the mass 612 is represented as M connected at a distance L from the pivot point (i.e., the length of the arm 610 extending from the pivot point), the stress force applied to the shape memory alloy, $\sigma_{SMA}$, is found by dividing the total force applied by the cross sectional area of the wire:

$$\sigma_{SMR} = \frac{MgL}{Ar}\cos\theta$$

where $\theta$ represents the angle of the arm 610 from horizontal, and g is the gravitational constant. To form a negative-differential spring (i.e., having a stress characteristic in which stress decreases as displacement increases), the lever 606 is initially started at a positive angle q between zero and 90 degrees from horizontal. As the SMA wire 602 is heated it contracts, rotating the lever 606 up to a final angle also between zero and 90 degrees. The cosine of the angle decreases as the angle increases, and thus the external stress applied to the wire decreases as the wire heats up.

To validate the effects of a negative-differential spring, the test arrangement can likewise be configured to represent a positive spring, in which applied stress increases as displacement increases. In this example, the lever 610 is initially started at a negative angle between negative 90 degrees and zero degrees. As the SMA wire 602 is heated and contracts it rotates the lever 610 up to a final angle also between −90 degrees and zero degrees. The cosine of the angle increases in this scenario, meaning the external stress in the wire increases as the wire is heated.

In the first test arrangement 600, the lever 610 is started at an initial angle of 40 degrees to achieve a negative-differential spring, and current is applied to the wire 602 until it completely transitions from Austenite to Martensite. A 0.5-kg mass is used, with a 0.1-m lever and 0.51-m initial SMA wire length. Current is increased approximately linearly over a 20-minute time interval, as illustrated further in FIG. 7. A Crossbow CXTA01 inclinometer is used to measure the rotation of the lever 610, and a BK Precision 1672 DC Power Supply used to provide electrical current to the wire 602.

Figure 7:
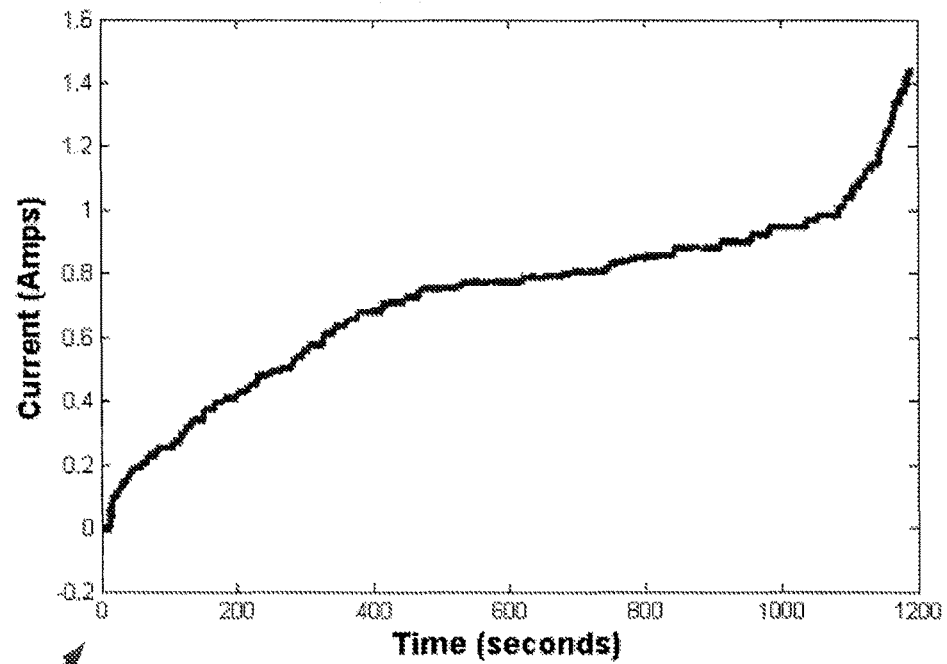
FIG. 7 is a chart representing current passing through a shape memory alloy over time during a tested temperature change in the test arrangement of FIG. 6.

FIG. 7 illustrates a chart 700 representing a plot of current against time for a test of the arrangement 600, in both the positive spring and negative-differential spring configurations. As seen in the chart 700, current is initially zero, and is gradually increased over time to approximately 1.5 amperes.

Figure 8:
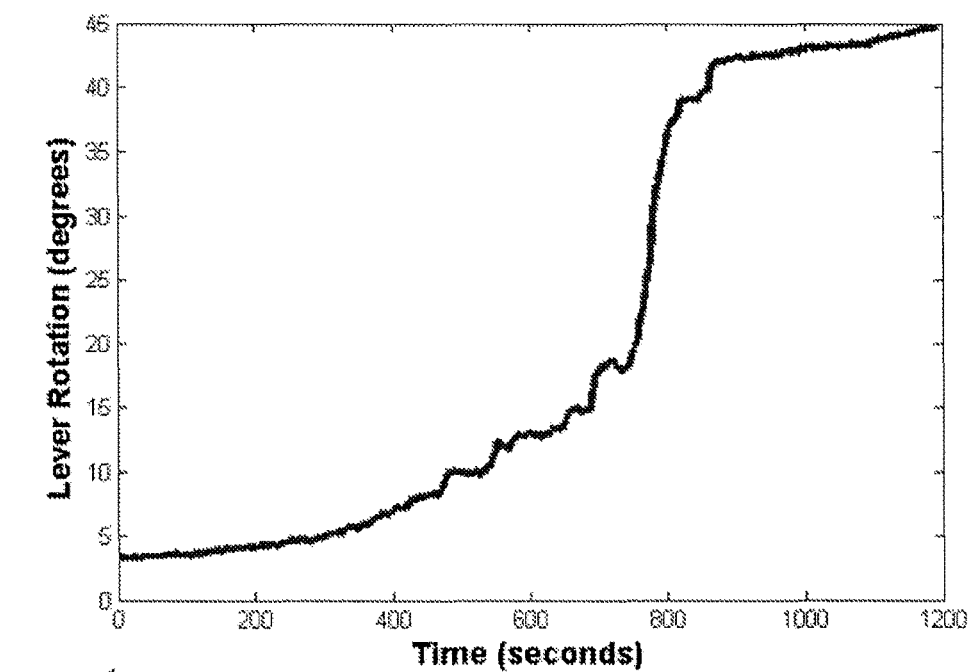
FIG. 8 is a chart illustrating rotation of a lever used as a negative-differential spring in the test arrangement of FIG. 6, concurrent with the current applied as illustrated in FIG. 7.

FIG. 8 illustrates a chart 800 representing a plot of lever rotation against time for the test arrangement 600, and in response to application of the current illustrated in the chart 700 of FIG. 7. As can be seen in the chart 800, at approximately the 800 seconds mark of the plot, a sharp transition occurs in the amount of lever rotation, between about 20 and about 45 degrees.

Figure 9:
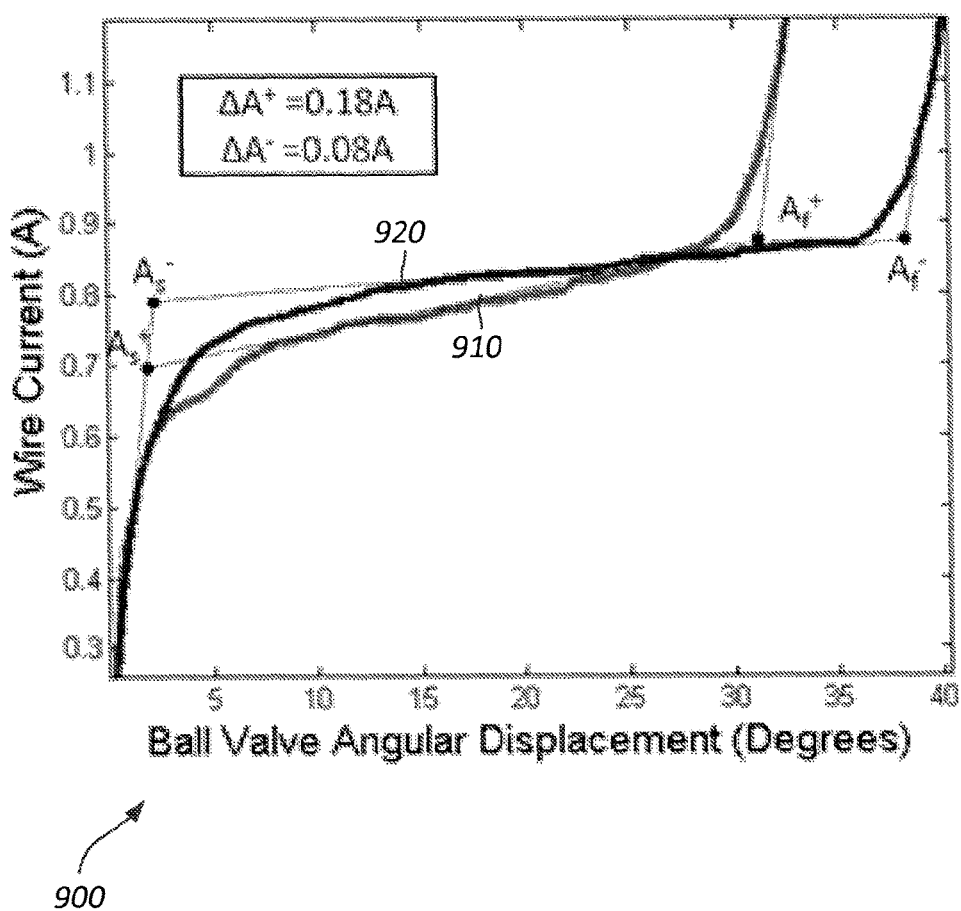
FIG. 9 is a chart illustrating angular displacement of a ball valve actuated by a shape memory alloy in the test arrangement illustrated in FIG. 6, illustrating a difference in response when using a positive spring and a negative-differential spring when applying a current as illustrated in FIG. 7.

FIG. 9 illustrates a chart 900 that compares experimental results of rotation of a lever 610 under positive spring and negative-differential spring configurations. Specifically, chart 900 represents an averaged, filtered set of experimental results over five experiments using the current application in chart 700 on the test arrangement 600. As seen in FIG. 9, a positive spring plot 910 indicates that, for the positive spring the $A_s^+-A_f^+$ difference is 0.18 Amperes. Comparatively, a negative spring plot 920 illustrates that for the negative-differential spring the $A_s^--A_f^-$ difference is 0.08 Amperes. If current is assumed to be roughly proportional to temperature in the wire 602 above an ambient temperature, then this 0.1-Ampere difference would correspond to an approximately 5° C. decrease in $A_s$-$A_f$ spread, using the masses and lever arm values stated above. Thus, the thermally actuated safety valve is potentially applicable to wells with gas-oil temperatures less than 6° C., even with relatively small changes to the force applied. Additionally, the SMA wire 602 contracts more in the negative-differential spring scenario. It is suspected that this is because, at the end of the heating cycle the wire contraction must overcome a smaller restoring force with a negative differential spring than with a positive spring. This finding could allow less SMA wire length to be used in a thermal actuator, such as in the gas lift safety valve applications described above.

Figure 10:
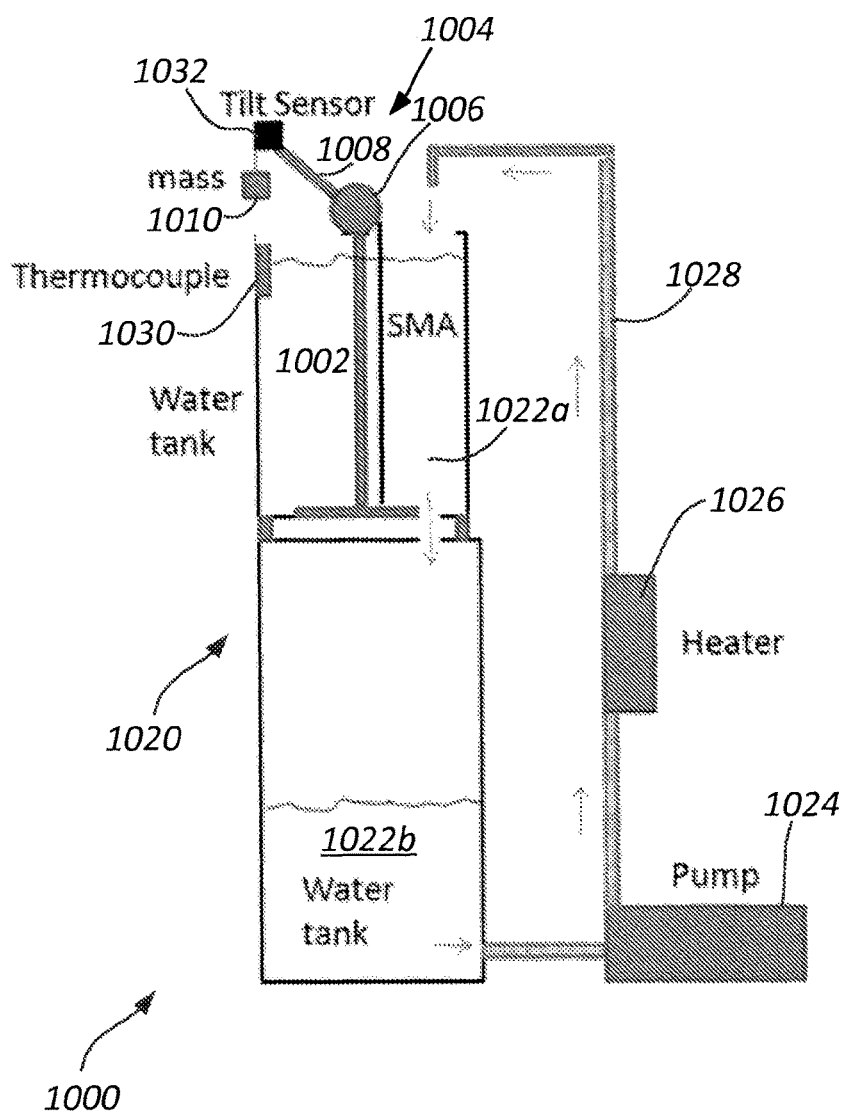
FIG. 10 is a schematic diagram illustrating a second test arrangement useable to form a thermal actuator including a shape memory alloy and having a sharp phase change, according to a second example embodiment.
Figure 11:
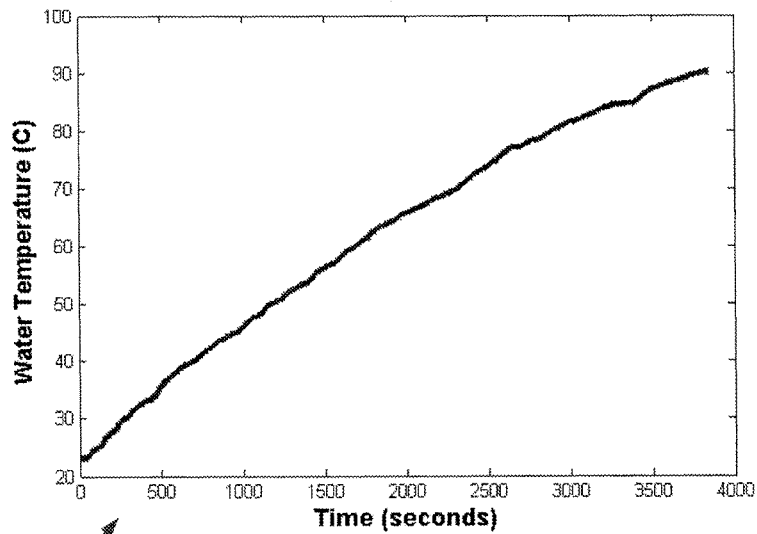
FIG. 11 is a chart representing a change in temperature of water over time, in which the shape memory alloy is immersed, in the test arrangement of FIG. 10.
Figure 12:
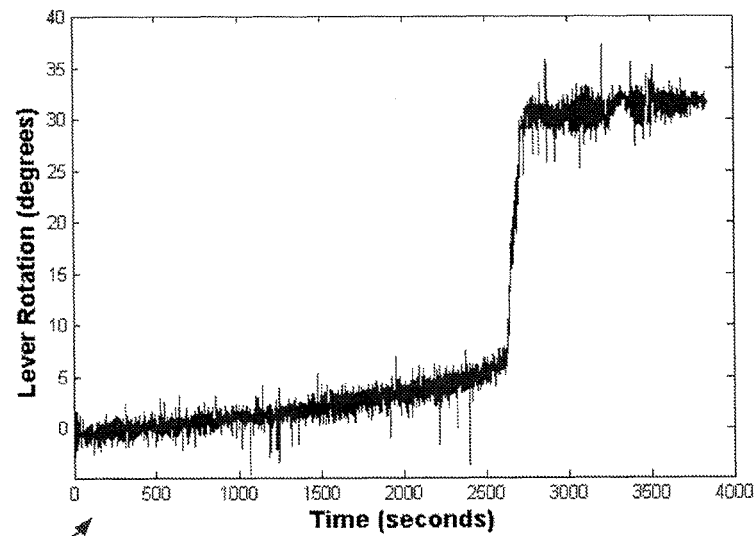
FIG. 12 is a chart illustrating rotation of a lever used as a negative-differential spring in the test arrangement of FIG. 10, concurrent with the current applied as illustrated in FIG. 11.

Referring now to FIGS. 10-12, a second possible test arrangement 1000 is shown, in which a conductive heating arrangement is provided. In this test arrangement 1000, a shape memory alloy 1002 is connected to a rotatable lever 1004, which includes a generally circular portion 1006 and a lever arm 1008. A mass 1010 is attached to the end of the lever arm 1008, similarly to the arrangement of FIG. 6.

In this second test arrangement 1000, the shape memory alloy 1002 is heated by conduction, using immersion in water. Accordingly, the shape memory alloy 1002 is positioned within a water tank 1020, which includes upper and lower water reservoirs 1022a-b, respectively, between which water can drain. The lower water reservoir 1022 is fluidically connected to a pump 1024, which directs water to a heater 1026, and from the heater through a conduit 1028 into the upper water reservoir 1022a, thereby heating the water surrounding the shape memory alloy 1002. A thermocouple 1030 monitors the temperature of water in the upper reservoir, and a tilt sensor 1032 monitors tilt of the lever arm 1008 based on changes to the shape memory alloy 1002.

In the test arrangement 1000 shown, the mass 1010 that is selected is 0.1-kg was used, and the shape memory alloy 1002 has an initial length of 0.51-m. The lever arm 1008 is 0.1-m in length. Water was pumped from the lower reservoir 1022b, through the heater 1026, and into the upper reservoir 1022a encircling the SMA wire 1002. The water is then allowed to drain back into the reservoir. The heater 1026 is, in the test arrangement 1000 as shown, an Omegadyne 6 kilowatt TruHeat STFT-6000-240 heater, and the thermocouple 1030 is a National Instruments T-type thermocouple model 746061-01. The thermocouple 1030 is calibrated to ambient air temperature of 20 C.

As with the test arrangement of FIGS. 6-9, in the negative-differential spring set of experiments the lever was started at 40 degrees tilt, and in the positive spring simulation the lever was started at negative 40 degrees. In the test arrangement 1000, the water gradually heated over approximately 40-minutes until the wire transitioned from Austenite to Martensite.

Figure 13:
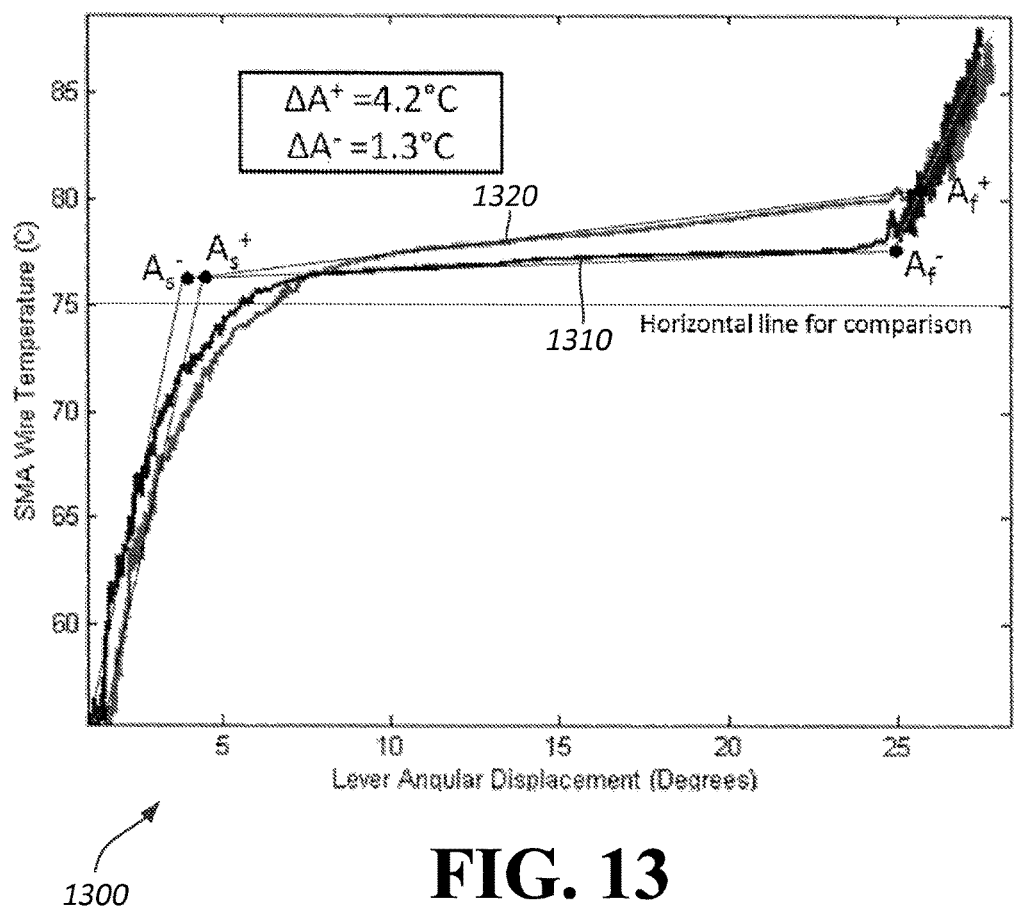
FIG. 13 is a chart illustrating angular displacement of a ball valve actuated by a shape memory alloy in the test arrangement illustrated in FIG. 10, illustrating a difference in response when using a positive spring and a negative-differential spring when applying a change in temperature in fluid, as seen in FIG. 11.

Referring now to FIGS. 11-13, results of measurements during a test of the shape memory alloy 1002 and associated spring arrangements using a rotatable lever 1004 are shown. The charts depicted in FIGS. 11-13 represent averages experienced across a set of repeated experiments on the effect of stress applied by a negative-differential spring on a shape memory alloy 1002.

In FIG. 11, a chart 1100 illustrating water temperature versus time for an example heating trial is shown. As illustrated, water temperature increased at a generally consistent rate from about 20° C. to about 90° C. over the course of about an hour.

In FIG. 12, a chart 1200 illustrates a degree of lever rotation over time, in response to the change in temperature plotted in FIG. 11. As seen in chart 1200, at approximately 45 minutes into the test, the vast majority of angular movement was experienced, over a relatively small change in temperature. This observation is confirmed in FIG. 13, which compares this arrangement to that of a positive spring configuration, in a chart 1200 comparing temperature of the shape memory alloy 1002 against angular displacement of the lever arm 1008. As illustrated in chart 1300, a positive spring plot 1310 and a negative spring plot 1320 are compared. As seen in the plot 1302 illustrating responsiveness of the shape memory alloy 1002 when a positive spring is applied, the $A_f^+-A_s^+$ temperature difference is 4.2° C., while for the negative-differential spring the $A_f^--A_s^-$ temperature difference is 1.3° C. Thus the negative-differential spring decreased the $A_s$-$A_f$ temperature difference by 2.9° C. in this circumstance, allowing a shape memory alloy having a reaction temperature range previously in excess of about 6° C. to be far reduced below that amount.

In comparison to the chart 900 in FIG. 9, in the chart 1300 the negative differential spring and positive spring reach approximately the same ending angle (seen in the overlapping lines above $A_f$, just in excess of 25 degrees. This may be attributable to the fact that, in the test arrangement 1000 a smaller mass was used than in test arrangement 600 (0.1-kg instead of 0.5-kg), which could contribute to a lessened difference in restoring force between the two scenarios near the end of the heating cycle.

In use, it is noted that application of a negative-differential spring to a shape memory alloy of a valve actuator will allow reduction of a threshold temperature change required to cause movement of a valve between open and closed positions. When the shape memory alloy experiences a change in temperature, including a change that would in the absence of the negative-differential spring be insufficient to complete the Martensite-Austenite transition, the valve actuator including the shape memory alloy can cause actuation of the valve. For example, in the case of a gas-lifted well, the temperature change may be in response to introduction of a gas at a first temperature (e.g., for gas lifting), and detection of a liquid at a second temperature (i.e., higher temperature hydrocarbons rising through the valve), thereby causing actuation of the valve associated with the sharp response valve actuator discussed herein.

It is noted that, although the experimental results in FIGS. 6-13 are provided based on observation using a lever-arm type negative-differential spring, other types of negative-differential spring could be used to similar effect. Accordingly, the particular negative-differential spring that would be used is at least somewhat dependent upon application. For example, opposed shape memory alloys may be useable in a circumstance where current-based actuation is available, but might not be used where only conductive heating is available, such as in the gas-lifted well arrangements discussed herein. Other arrangements discussed herein, such as a mass on a lever rotating from horizontal to vertical, a coiled metal ribbon of decreasing width, and a wire rotating a cam of decreasing radius, may also have other circumstances where they may or may not be the optimal negative-differential spring. However, the various embodiments discussed herein, when components are selected to match the temperatures experienced by the shape memory alloy and the characteristics of the shape memory alloy, will allow the safety valve to actuate with less than a 6° C. temperature difference. More broadly, this invention would allow any device actuated by SMAs to become much more precise, i.e. translating a small temperature change into a large displacement.

The foregoing description of illustrated embodiments of the present disclosure, including what is described in the abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope of the disclosure. Therefore, many modifications may be made to adapt a particular situation or material to the essential scope of the present disclosure. It is intended that the disclosure not be limited to the particular terms used in following claims and/or to the particular embodiment disclosed as the best mode contemplated for carrying out this disclosure, but that the disclosure will include any and all embodiments and equivalents falling within the scope of the appended claims.

The invention claimed is:

1. A valve actuator comprising:
a shape memory alloy element attachable to a valve body, capable of use with a valve to cause movement of the valve between first and second positions responsive to at least a specified amount of temperature change of the shape memory alloy element; and
a negative-differential spring applied to the shape memory alloy element, thereby reducing the specified amount of temperature change needed to cause movement of the valve between the first and second positions, the transition temperatures of the shape memory alloy element being tuned to the specified amount of temperature change, wherein a lever is connected to the shape memory alloy element and allowed to rotate when the temperature applied to the shape memory alloy element increases, the lever includes a lever arm, wherein angular displacement of the lever arm is associated with the specified amount of temperature change of the shape memory alloy element, wherein the negative-differential spring applies a first stress to the shape memory alloy element when the shape memory alloy element is near the Austenitic start temperature, and a second stress lower than the first stress when the shape memory alloy element is near the Austenitic finish temperature.

2. The valve actuator of claim 1, wherein the shape memory alloy element contracts from a first length to a second length when heated from a first temperature to a second temperature.

3. The valve actuator of claim 2, wherein the first temperature is an Austenitic start temperature, and wherein the second temperature is an Austenitic finish temperature.

4. The valve actuator of claim 2, wherein the shape memory alloy element extends from the second length to the first length when cooled from a third temperature to a fourth temperature.

5. The valve actuator of claim 4, wherein the third temperature is a Martensitic start temperature and the fourth temperature is a Martensitic finish temperature.

6. The valve actuator of claim 1, wherein the negative-differential spring comprises a spring arrangement selected from the group of spring arrangements consisting of:
a mass on a lever rotating from horizontal to vertical;
a coiled metal ribbon of decreasing width; and
a wire rotating a cam of decreasing radius.

7. The valve actuator of claim 1, wherein the first and second positions correspond to open and closed valve positions.

8. The valve actuator of claim 1, wherein the shape memory alloy element comprises an elongated member attached to an extending member of the valve body.

9. The valve actuator of claim 1, wherein the valve fully actuates over a temperature difference of less than about 6° C.

10. A valve, comprising:
a valve body;
an orifice disposed within the valve body;
a fluid flow restraining member located at a first location of the orifice, the fluid flow restraining member movable between a closed position and an open position;
a shape memory alloy element causing a pivotal movement of the fluid flow restraining member between the open and closed positions responsive to at least a specified amount of temperature change of the shape memory alloy element; and
a negative-differential spring applied to the shape memory alloy element, thereby reducing the specified amount of temperature change needed to cause movement of the valve between the open and closed positions, the transition temperatures of the shape memory alloy element being tuned to the specified amount of temperature change wherein a lever is connected to the shape memory alloy element and allowed to rotate when the temperature applied to the shape memory alloy element increases, the lever includes a lever arm, wherein angular displacement of the lever arm is associated with the specified amount of temperature change of the shape memory alloy element, wherein the negative-differential spring applies a first stress to the shape memory alloy element when the shape memory alloy element is near the Austenitic start temperature, and a second stress lower than the first stress when the shape memory alloy element is near the Austenitic finish temperature.

11. The valve of claim 10, wherein the valve fully actuates over a temperature difference of less than about 6° C.

12. A method of actuating a valve from an open position to a closed position, the method comprising:
applying a force to a shape memory alloy using a negative-differential spring, thereby reducing a specified temperature change needed to cause movement of the valve between first and second positions;
experiencing a change in temperature from a first temperature to a second temperature at a valve actuator including the shape memory alloy;
actuating the valve between the open position and the closed position in response to the change in temperature, wherein the change in temperature is greater than the specified temperature change, the transition temperatures of the shape memory alloy element being tuned to the specified amount of temperature change, wherein a lever is connected to the shape memory alloy element and allowed to rotate when the temperature applied to the shape memory alloy element increases, the lever includes a lever arm, wherein angular displacement of the lever arm measures the specified amount of temperature change of the shape memory alloy element;
applying a first stress to the shape memory alloy element when the shape memory alloy element is near the Austenitic start temperature, and a second stress lower than the first stress when the shape memory alloy element is near the Austenitic finish temperature.

13. The method of claim 12, wherein the valve comprises a gas lift safety valve installed within a gas-lifted oil well.

14. The method of claim 13, further comprising introducing at the valve a gas at a first temperature and, at a later time, introducing a liquid at a second temperature higher than the first temperature, thereby actuating the valve.

15. The method of claim 12, wherein the threshold temperature change is less than about 6° C.

* * * * *